Jan. 14, 1941. J. A. SPENCER Re. 21,695

RECORD STRIP FEEDING MEANS

Original Filed July 15, 1933 2 Sheets-Sheet 1

INVENTOR
James A. Spencer.
BY
E. C. Sanborn
ATTORNEY

Jan. 14, 1941. J. A. SPENCER Re. 21,695

RECORD STRIP FEEDING MEANS

Original Filed July 15, 1933 2 Sheets-Sheet 2

INVENTOR
James A. Spencer
BY
E. C. Sanborn
ATTORNEY

Reissued Jan. 14, 1941

Re. 21,695

UNITED STATES PATENT OFFICE 21,695

RECORD STRIP FEEDING MEANS

James A. Spencer, Teaneck, N. J., assignor to Trans-Lux Movie Ticker Corporation, New York, N. Y., a corporation of Delaware Original No. 1,981,376, dated November 20, 1934, Serial No. 680,545, July 15, 1933. Application for reissue August 21, 1936, Serial No. 97,262

22 Claims. (Cl. 178—42)

This invention relates to means for controlling the feeding of a record strip. The invention provides a novel and effective mechanism especially adapted for controlling feeding of the tapes of standard stock tickers or printing telegraphs. In the tickers heretofore employed for receiving quotations or other data from a distant point and printing them upon a tape or record strip inconvenience and annoyance result from the fact that the character last printed is not promptly fed into the field of vision. The present invention provides for feeding the last printed character into readily visible position immediately following printing thereof and for arresting it at that point until the ticker or printer resumes operation. Thus, the data or transaction last printed may be projected upon a screen, timed with an automatic stamp, or otherwise utilized promptly following the printing thereof on the tape. The invention further enables the tape to be fed continuously throughout a succession of printing operations occurring within predetermined time intervals while at the same time assuring undelayed feeding of the last printed character into the field of vision whether or not the next printing operation occurs within a given time. The invention further presents the advantage of providing a continuous movement of the tape, free from shock or vibration without the aid of shock absorbing devices. A further feature of the invention comprises a feeding means attaining the results above outlined and applicable to standard stock tickers without material alteration of the latter. All of the foregoing advantages are, moreover, obtained without the necessity of carrying electrical circuits into or near the ticker or printer. Further features of the invention will be hereinafter described or claimed.

Figure 1:
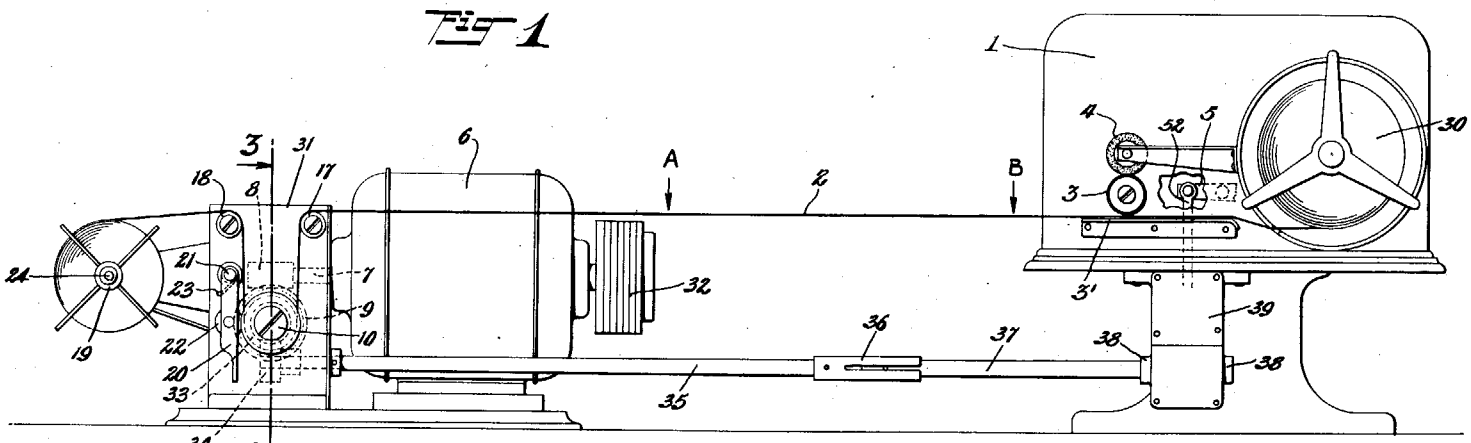
Fig. 1 is a view in side elevation illustrating an embodiment of my invention in conjunction with a stock quotation ticker of conventional type.
Figure 2:
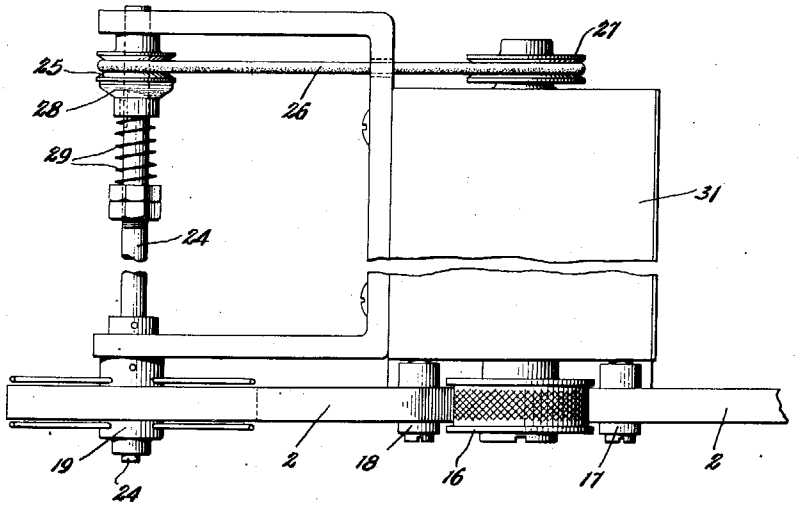
Fig. 2 is a plan view showing a portion of the feeding devices, on an enlarged scale.

Referring to the drawings, there is shown at 1 a ticker of conventional type for printing stock quotations or other data upon a movable tape or record strip 2. The ticker includes the customary type wheel 3 and inking roller 4 together with the usual means (not shown) for setting the wheel to bring the desired character thereon into printing position and thereafter forcing said record strip momentarily against the type-wheel. The usual platen 3′ underlies said tape adjacent the printing wheel. Also the ticker comprises the well-known bail 5, which is moved upwardly from its normal lowered position and then returned downwardly thereto in each cycle of operation of the printing mechanism. In the customary practice this bail carries a pawl for operating a wheel to feed the tape forwardly one increment in each printing cycle; the character last printed, however remaining obscured from view by the type wheel until the tape is moved forward, either by hand or in subsequent printing operations, a distance corresponding to several of such increments.

In carrying out my invention I utilize a continuously running motor 6, which may be any suitable or conventional electric motor and provide connections between said motor and the tape 2 whereby the motor constantly tends to feed said tape. In the embodiment shown the shaft 7 of the motor armature has secured thereto a worm 8 which meshes with a worm wheel 9 loosely mounted on the shaft 10. Friction means is provided for clutching said worm wheel to the shaft 10; said means comprising a disk 11 fastened to said shaft and provided with friction material 12 engaging one face of said worm wheel 9, and a disk 13 slidable on shaft 10 and having similar friction material 12 engaging the opposite face of said wheel 9. A spring 14 bearing at one end against a suitable collar or other abutment 15 on shaft 10 and at its other end against the disk 13 maintains firm frictional engagement between the worm wheel 9 and the disks 11 and 13. To one end of said shaft 10 there is secured the sheave or pulley 16 around which the tape is passed. Specifically, the tape may, as shown, be passed over a roller 17, pulley 16, and roller 18, and thence to the take-up or storage reel 19. An arm 20, pivotally mounted at 21 carries a roller 22 and is urged by its spring 23 so that through said roller 22 the tape is pressed against the pulley 16 and is fed by the latter to the reel 19. The latter is secured to a shaft 24 having a pulley 25 thereon connected by a friction belt or cord 26 to pulley 27 fixed to shaft 10.

Any suitable means may be provided for facilitating winding of the tape upon the reel 19 despite the increasing accumulation of the tape on said reel while the rate at which the feed pulley 16 rotates remains constant. Such means is here shown as of a well-known type, comprising a disk 28 splined to, but slidable upon, the shaft 24 and maintained in frictional engagement with pulley 25 by spring 29. Provision for slippage is thus effected between said pulley and shaft whereby compensation is made for the increasing diameter of the tape on the reel during the uniform feeding of the tape to said reel by the aforesaid pulley 16.

From the foregoing description it will be seen that so long as the shaft 10 is free to be rotated by the motor 6 the tape 2 will be fed from the supply reel 30, and onto the storage reel 19. The drive connections between the motor 6 and shaft 10 may, as shown, be enclosed in a suitable casing 31. The speed of rotation of pulleys 17 and 27 may be maintained substantially constant by any suitable means, such as the governor 32 (Fig. 1) of conventional design.

Figure 3:
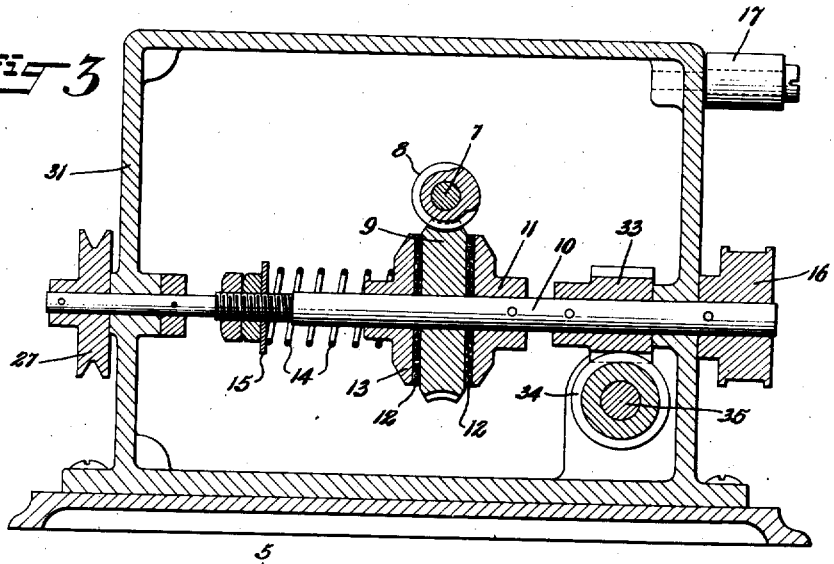
Fig. 3 is a vertical sectional view on an enlarged scale, on line 3—3 of Fig. 1.
Figure 4:
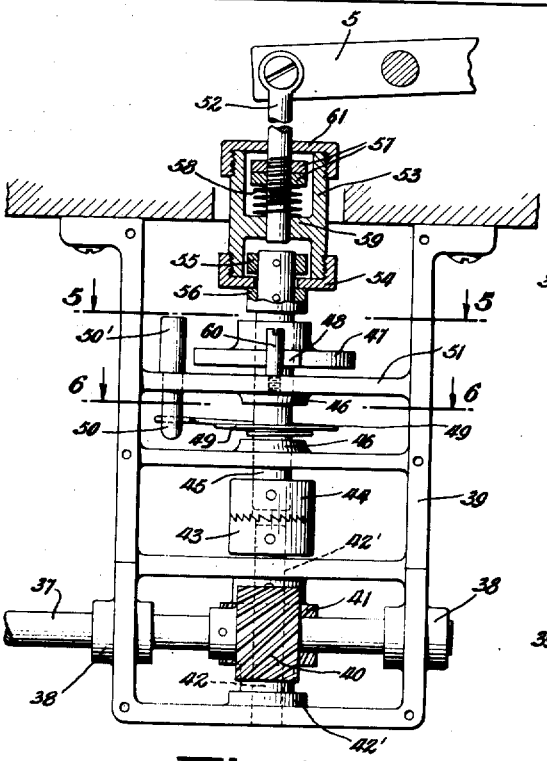
Fig. 4 is a view in elevation, on an enlarged scale, showing the parts within the casing containing the feed control unit and their connection to the ticker, certain parts being shown in vertical section.
Figure 5:
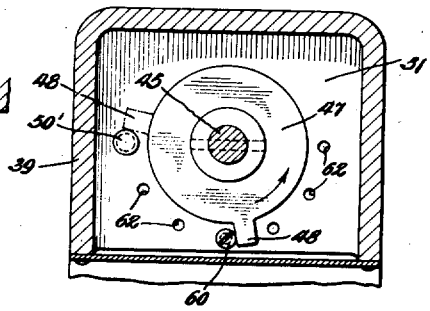
Fig. 5 is a horizontal section on line 5—5 of Fig. 4.
Figure 6:
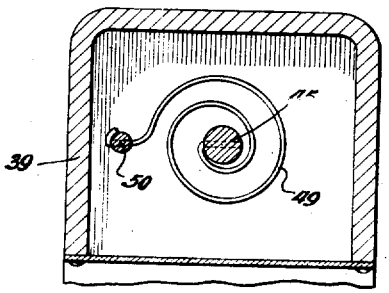
Fig. 6 is a horizontal section on line 6—6 of Fig. 4.

The rotation of shaft 10 by motor 6, and consequent feeding of the tape 2, is controlled by means coordinated with the ticker and which may be constructed as follows:

Secured to shaft 10 is a worm 33 (Fig. 3) meshing with a worm wheel 34 fast to a shaft 35. The latter may be connected through the flexible coupling 36 (Fig. 1), of well known type, to a shaft 37 which extends into bearings 38, 38 in a casing 39 (Fig. 4). Fastened on shaft 37 is a worm 40 which engages a worm gear 41 on a vertical shaft 42 rotatable in suitable bearings 42', 42' in said casing. To the upper end of said shaft 42 is secured a toothed clutch member 43. A similar toothed clutch member 44 adapted to engage said member 43 is secured to the lower end of a vertical shaft 45 rotatable in bearings 46, 46 and also vertically movable therein. Shaft 45 has secured thereto a disk 47 provided with a radially projecting finger 48. A spring 49, secured at one end to a stud 50 and at the other end to shaft 45, constantly urges said shaft to turn in the direction indicated by the arrow in Fig. 5 and to bring said finger 48 into the position shown in dotted lines in Fig. 5, in which position said finger engages stud 50', blocking further rotation of shaft 45 in said direction. Studs 50 and 50' may, as shown in Fig. 4, be formed as one element and mounted in partition 51 of the casing 39.

The vertical position of the shaft 45 is controlled by the previously-mentioned bail 5; for which purpose the pawl previously referred to as mounted on said bail for cooperation with a feed wheel is omitted and the bail connected to shaft 45 through means including a rod 52 pivoted to said bail and depending therefrom into a casing 53. Shaft 45 extends upwardly through an opening in the bottom plate 54 of said casing and is provided with collars 55, 56 secured to said shaft and lying respectively above and below said casing. Positioned within casing 53 and threadedly engaged with shaft 52 are washers 57. A spring 58 bears at one end on a partition 59 in said casing and at its other against one of the washers 57.

In the normal position of the parts, shown in Fig. 4, the bail 5 is in its lowermost position, and clutch members 43 and 44 are engaged with each other. The motor 6 tends to turn the shaft 45 in the direction opposite to that indicated by the arrow in Fig. 5, but such rotation is blocked by the engagement of finger 48, with the stud 60 mounted in the partition 51. When the ticker commences to operate the bail 5 rises, carrying upwardly the rod 52. During the upward movement of said rod, one of the washers 57 engages the top plate 61 of casing 53, raising the latter, and, through the engagement of bottom plate 54 of said casing with collar 55, lifting the shaft 45, thereby disengaging clutch member 44 from the cooperating member 43. The tape feeding shaft 10 is now freed and immediately starts rotating. Rotation of shaft 10 and feeding of the tape continue as long as clutch members 43 and 44 are disengaged and finger 48 is out of engagement with stud 60. At the end of each cycle of operation of the ticker, the bail 5 is in its normal downward position; said bail as hereinbefore noted, making one complete oscillation in each printing cycle. Clutch members 43, 44 are thus again interengaged, but the tape feeding shaft is free to continue rotating until finger 48 is moved from stud 50' into engagement with stud 60. If, before finger 48 reaches stud 60, the bail 5 rises and disengages clutch member 44 from member 43, the spring 49 returns finger 48 into engagement with stud 50', so that rotation of shaft 10 and feeding of the tape continue uninterruptedly throughout the ensuing cycle of operation of the printing mechanism and until such further time as finger 48 engages stud 60. In short, the tape feeding mechanism, when brought into action by the rising of bail 5, continues in action without interruption throughout a series of cycles of operation of the printing mechanism so long as each succeeding cycle of the series follows the preceding one within a predetermined time interval, corresponding to the time required for the moving of finger 48 from stud 50' to stud 60. At the same time, even though a succeeding cycle does not commence until after the finger 48 has been engaged with stud 60, the feeding of the tape to bring the character last printed into visible position is assured, the distance traversed by finger 48 between the studs 50' and 60 being such that the corresponding operation of the tape feeding mechanism will position said character clearly within the field of vision. The feed of the tape during the travel of finger 48 between said studs may be such as to bring the character last printed into the region between points A and B in Fig. 1, the characters in which region may be thrown upon a screen by suitable projecting apparatus. If desired, the last printed character may be fed into position adjacent an automatic time stamp whereby said character may be timed promptly following the printing thereof. In any event, it will be apparent that my invention provides for the immediate and undelayed feeding of the last character printed into a position wherein it is plainly visible and may be utilized in any manner desired.

The stud 60 is shown as removable and may be inserted in any of a series of holes 62 in the partition 51, whereby the extent of travel of the finger 48 into contact with said stud, and thus the distance of feed of the tape in the lowered position of bail 5, may be varied. If desired, stud 60 may be removed entirely, in which case the extent of feed of the tape in the lowered position of the bail 5 will be limited by the engagement of finger 48 with the side of stud 50' opposite to that shown engaged by said finger when in the dotted line position in Fig. 5.

The play provided between shafts 52 and 45, through the spacing of washer 57 from casing plate 61 and the spacing of plate 54 from washer 55 facilitates complete engagement of the teeth of clutch member 44 with the recesses between the teeth of member 43 even though during the descent of shaft 45 the teeth of member 44 may first engage the extreme upper portions of the teeth of member 43. Spring 58 assists in this action.

In the conventional ticker to which the invention is shown applied each printing cycle accomplishes the printing of a single character of the quotation or other data; and it will be apparent that by positioning the stud 60 an appropriate distance from stud 50' the feeding of the tape may be effected continuously throughout a series of cycles corresponding to the printing of the characters of a quotation and the last character of the latter fed into visible position; the feeding then interrupted if the ticker does not resume operation within a predetermined time for printing the next quotation, and said feeding, if so interrupted, being automatically resumed upon said resumption of operation of the ticker.

The invention is especially advantageous in conjunction with a standard stock ticker wherein the time intervals between the printing of the successive characters of a quotation are uniform. Its utility is, however, manifestly not restricted to any particular printing device. It will be noted that the application of the invention to a conventional ticker involves no change in the latter other than the removal of the customary feed pawl from the bail 5, and the attachment of the rod 52 to said bail. The same bearing screw that serves as the pivot for the said feed pawl may be employed for pivotally mounting the rod 52 on said bail.

In other words, the customary feed pawl and the feed wheel (referred to in an earlier part of the specification) to which it is operatively connected for feeding the tape forwardly one increment in each printing cycle of the conventional message-receiving and reproducing device or ticker has, in accordance with the present invention, been replaced by mechanically operated mechanism including the rod 52, casing 53, clutch members 43 and 44, disk 47, finger 48, stops 50' and 60, and spring 49 to provide not only a forward feeding of the tape during the printing operations of the ticker, but also for causing a continued operation of the tape-advancing pulley 16 during a predetermined cessation of the operation of the message-receiver and printer, i. e. the ticker, so that during any such cessation the time of which exceeds the predetermined period, the character last printed will at once be brought into the field of vision or the region between points B and A of Fig. 1. The mechanically operated elements (52, 53, 43, 44, 47, 48, 50', 60, and 49) used in the present invention in replacing the feed pawl and feed wheel of the conventional ticker are embodied in the ticker mechanism just as were the old feed pawl and its feed wheel being all intimately connected with and responsive to the action of the ticker every time it prints a character and operates the bail 5. They are no part of the projecting system but an integral part of the ticker mechanism.

It will further be noted that during a series of cycles of operation of the printing mechanism the clutch 43 will be continuously rotated by the motor 6, the clutch member 44 alternately engaging and disengaging the clutch member 43 as the result of the up-and-down reciprocation of the bail 5. But the engagement or disengagement of these two clutch members will be without effect so long as the ticker continues to emit messages at a normal, continuous, uninterrupted rate. At the end of a series of cycles of operation, however, when the ticker pauses or stops, the bail 5 remains in its lowermost position, maintaining the clutch members 43 and 44 in engagement with each other for a sufficient period at least to enable the finger 48 to engage the stop 60, thereby locking the connection between worm gears 41 and 40, preventing further rotation of shaft 37 and its extension 35, and thus in turn inhibiting motion of the shaft 10 and of the tape-feeding pulley 16. The result of these activities is to cause the worm wheel 9 to continue to revolve idly on the shaft 10, said wheel 9 during this period slipping past the friction disks 11 and 13. It thus appears that there is an out-of-phase relation between the engagement of the clutch members 43 and 44 and the operation of the finger 48 and stop 60, and it is this out-of-phase operation between such parts which is in turn relied upon to control, through the friction disks 11 and 13, the continued effective actuation of the pulley 16 until the last printed character on the tape has been advanced into the field of vision. There is a further out-of-phase relationship between the clutch member 43 and the clutch member 44 which controls the spring 49, and which in turn assures continued actuation of the motor-actuated tape-feeding pulley 16 until upon a predetermined cessation of the ticker further actuation of the motor-actuated tape-feeding pulley 16 is inhibited.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, means for printing upon a record strip, means operable in each cycle of operation of said printing means, a continuously running motor, and mechanical means controlled by the second mentioned means for causing said motor to feed said strip following a printing operation a distance sufficient to bring the character last printed into the field of vision during a time of greater than a given duration wherein no subsequent printing operation occurs.

2. In combination, means for printing upon a record strip, a continuously running motor, means operable from and to normal position in each cycle of operation of said printing means, means for feeding said record strip into the field of vision of an adjacent projecting apparatus, and mechanical means for causing said motor to operate said feeding means in response to operation of the second named means from normal position and for causing said feeding means to feed the record strip through a predetermined extent following the return of said second named means to normal position during a time of greater than a given duration wherein no subsequent printing operation occurs and which extent is necessary to bring the character last printed into said field of vision.

3. In combination, means for printing upon a record strip, a continuously running motor, and control means correlated with said printing means for causing said motor to feed said strip following a printing operation an amount sufficient to bring the character last printed into the field of vision whenever a succeeding printing operation fails to take place within a predetermined time, said control means comprising a member shiftable into position for operation by said motor at the end of a printing cycle.

4. In combination, means for printing upon a record strip, a continuously running motor, an element movable in each cycle of operation of the printing means, and control means correlated with said element for causing said motor to feed the record strip continuously throughout a succession of printing operations the time intervals between which are less than a given duration and for insuring feeding of said strip by said motor a predetermined distance into the field of vision of an adjacent projecting apparatus after completion of a printing operation during a time of greater duration wherein no subsequent operation occurs and which distance is necessary to bring the character last printed into said field of vision, said control means comprising a member operable by said motor and a stop element limiting the extent of movement of said member.

5. In combination, means for printing upon a record strip, means for feeding said record strip, a continuously running motor cooperating therewith, and means correlated with said printing means and comprising an element shiftable into and out of position for operation by said feeding means for causing said feeding means to feed said strip continuously throughout a succession of printing operations the time intervals between which are less than a given duration and to feed said strip a sufficient distance following the last of said succession of operations to bring the matter last printed into visible position.

6. In combination means for printing upon a record strip, an element movable in each cycle of operation of said printing means, strip feeding means for feeding the strip into the field of vision of an adjacent projecting apparatus, control means responsive to movement of said element in a printing cycle for bringing said feeding means into action and for insuring continuation of the feeding means sufficiently to feed the strip a predetermined distance following completion of said printing cycle and which distance is necessary to bring the character last printed into said field of vision, said control means comprising a member movable by said element into and out of position for operation by said feeding means in each printing cycle.

7. In combination, means for printing upon a record strip, an element movable away from and back to its normal position in each cycle of operation of said printing means, strip feeding means for feeding the strip into the field of vision of an adjacent projecting apparatus, a continuously running motor, and control means responsive to movement of said element from normal position for causing said motor to operate said feeding means and to continue feeding said strip a predetermined distance after the return of said element to its normal position and which distance is necessary to bring the character last printed into said field of vision, said control means comprising a member movable by said motor and a stop element preventing movement of said member beyond a predetermined extent.

8. In combination, a ticker adapted to print characters successively on a record strip in successive cycles of operation, record strip feeding means, and control means correlated with said ticker for controlling said feeding means to cause said record strip to be fed continuously through a series of cycles of operation of said ticker wherein characters constituting a complete quotation are printed and for insuring feeding of said strip an extent sufficient to bring the last character of said quotation into visible position immediately following the printing thereof, said control means comprising a member shiftable into and out of position for operation by said feeding means, and a stop element preventing movement of said member beyond a predetermined extent.

9. In combination, means for printing upon a record strip, means for feeding said record strip, means constantly tending to operate said feeding means, a rotatable member shiftable into and out of rotative relation with said feeding means, and means correlated with said printing means for controlling said member, and a stop element so related to said member as to be engaged thereby after movement thereof with said feeding means through a predetermined extent.

10. In combination, means for printing upon a record strip, means for feeding said record strip, means constantly tending to operate said feeding means, an element operatively connectable to said feeding means, means correlated with said printing means for establishing operative relation between said element and said feeding means at the end of a printing cycle, and means controlled by said element for blocking operation of said feeding means beyond a predetermined extent while said element is in operative relation to said feeding means.

11. In combination, means for printing upon a record strip, means for feeding said record strip, a rotatable member driven by said feeding means, a rotatable element connectable to said member, means correlated with said printing means for connecting said element with said member at the end of a printing cycle, a projection carried by said element, a stop member engageable by said projection upon operation of said element a predetermined extent by the first mentioned member for blocking operation of said feeding means, and spring means for returning said projection into a predetermined spaced relation from said stop member upon disengagement of said element from the first mentioned member.

12. In combination, means for printing upon a record strip, means for feeding said record strip, means constantly tending to operate said feeding means, a member driven by said feeding means, a shaft connectable to said member, a projection rotatable with said shaft, a stop engaged by said projection upon rotation of said shaft by said member through a predetermined extent, means correlated with said printing means for connecting said shaft to said member, and spring means connected to said shaft for rotating the latter to bring said projection into a predetermined relation to said stop when said shaft is disconnected from said member.

13. In combination, means for printing upon a record strip, means for feeding said record strip, means constantly tending to operate said feeding means, a rotatable shaft connectable to said feeding means, means correlated with said printing means for disconnecting said shaft from said feeding means at the beginning of a printing cycle and for connecting said shaft to said feeding means at the end of said cycle, a projection movable concurrently with rotation of said shaft, a stop engageable by said projection for blocking rotation of said shaft by said feeding means, and means responsive to disconnection of said shaft from said feeding means for rotating said shaft in the direction opposite to that in which it is rotated by said feeding means.

14. In combination, a ticker for printing characters upon a record strip in successive cycles of operation, said ticker comprising an element reciprocable to and from normal position in each printing cycle, and control means connected to said element for causing feeding of said strip continuously throughout a series of cycles separated by less than a predetermined time relation and for bringing the last printed character of the series into visible position immediately following printing thereof irrespective of the time of a succeeding cycle, said control means comprising a member shiftable by said element into and out of a position for actuation with said feeding means, and a stop member disposed at a predetermined distance from the first mentioned member.

15. In combination, a ticker for printing characters upon a record strip in successive cycles of operation, said ticker comprising an element movable to and from normal position in each printing operation, means for feeding said record strip, means constantly tending to operate said feeding means, a member rotatable with said feeding means, a shaft connected with said member when said element is in its normal position and disconnected from said member upon movement of said element out of normal position, a projection movable with said shaft, a stop engaged by said projection upon rotation of said shaft in one direction a predetermined extent by said feeding means for blocking further operation of said feeding means, and means for returning said projection into a predetermined relation to said stop upon disconnection of said shaft from said member.

16. In the combination defined by claim 15, means enabling the relation between the projection and stop to be varied to predetermine the extent of rotation of the shaft requisite to blocking of operation of the feeding means.

17. In combination, means for printing upon a record strip, means for feeding said record strip, an element movable in each cycle of operation of said printing means, a slidable and rotatable member connected to said element, means responsive to sliding movement of said member in one direction for bringing said feeding means into action, and means responsive to rotation of said member in a given direction for throwing said feeding means out of action.

18. In combination, a tape reel, a support, a recorder responsive to equal length letter codes disposed between said tape real and support, a tape puller disposed on the opposite side of said support from said recorder, and serving to draw said tape directly from said reel, past said recorder and across said support in a continuous movement, said recorder being arranged to record characters on said tape without interruption in the movement thereof, and means for arresting the movement of the tape after a predetermined length thereof, corresponding to several characters, has been advanced on to said support following an interruption in the operation of said recorder.

19. In combination, a quotation recorder operable in regular recurring cycles to record successive characters on a movable tape, means for moving said tape through the recorder, means for directly arresting the tape upon cessation of the cyclic operation of the recorder occurring between the characters of a quotation and means for retarding the capacity of said arresting means to effect an arrest until the last complete quotation printed shall have been drawn into a field of vision whenever a cessation of cyclic operation of the recorder occurs between successive quotations.

20. In combination, a field of vision, a data-recording device located at one side of said field of vision and having a tape supply, a tape-pulling device located at the opposite side of said field of vision and constituting the sole means for feeding the tape from said supply, means for operating said tape-pulling means continuously during a continuous succession of cycles of operation of said recording device whereby said tape is drawn in a continuous movement through said data-recording device and across said field of vision during said continuous succession of cycles of operation of the data-recording device, means for stopping the movement of the tape upon interruption of the operation of the data-recording device and means for delaying the stopping of the tape until the last printed character has been advanced into said field of vision.

21. In combination, a field of vision, a data-recording device located at one side of said field of vision and having a tape supply, a tape-pulling device located at the opposite side of said field of vision and constituting the sole means for feeding the tape from said supply, means for operating said tape-pulling means continuously during a continuous succession of cycles of operation of said recording device whereby said tape is drawn in a continuous movement through said data-recording device and across said field of vision during said continuous succession of cycles of operation of the data-recording device, means for stopping the movement of the tape upon interruption of the operation of the data-recording device, and means responsive to a selective operation of said data-recording device to advance the last printed character preceding such interruption into said field of vision.

22. In combination, a tape reel, a field of vision, a recorder disposed between said tape reel and field of vision and adapted to record a succession of regularly spaced characters on the tape while the latter is being fed in a continuous movement past the recording position thereof, a tape puller disposed on the opposite side of said field of vision from said recorder, and serving to draw said tape directly from said reel, past said recorder and across said field of vision in a continuous movement, and means for arresting the movement of the tape after a predetermined length thereof, corresponding to several characters, has been advanced into said field of vision following an interruption in the operation of said recorder.

JAMES A. SPENCER.